United States Patent [19]

Gaetano

[11] Patent Number: 5,195,554
[45] Date of Patent: Mar. 23, 1993

[54] SHIELDED ASSEMBLY FOR THE DELIVERY OF FUEL ENTIRELY DISAPPEARING INTO THE GROUND AND DIRECTLY CONNECTED TO THE FUEL TANK THROUGH A MANHOLE

[76] Inventor: Cutore Gaetano, Casella Postale 72, 00040 Montecompatri, Italy

[21] Appl. No.: 793,388

[22] PCT Filed: Jul. 3, 1990

[86] PCT No.: PCT/IT90/00059
§ 371 Date: Jan. 2, 1992
§ 102(e) Date: Jan. 2, 1992

[87] PCT Pub. No.: WO91/00214
PCT Pub. Date: Jan. 10, 1991

[30] Foreign Application Priority Data

Jul. 4, 1989 [IT] Italy .............................. 48159 A/89

[51] Int. Cl.⁵ .......................... B65H 75/34; F16L 5/00
[52] U.S. Cl. ............................... 137/355.19; 137/364; 137/371; 137/377
[58] Field of Search .................... 137/355.19, 371, 364, 137/377, 382

[56] References Cited

U.S. PATENT DOCUMENTS

| | | | |
|---|---|---|---|
| 362,450 | 5/1887 | Kubach | 137/355.19 |
| 2,497,969 | 2/1950 | Anderson | 137/364 |
| 2,828,762 | 4/1958 | Swank | 137/371 |
| 4,335,740 | 6/1982 | Boley | 137/364 |
| 4,706,718 | 11/1987 | Milo | 137/371 |
| 4,850,389 | 7/1989 | Moss | 137/364 |

FOREIGN PATENT DOCUMENTS 0167642 7/1984 European Pat. Off. .
0150686 10/1984 European Pat. Off. .

Primary Examiner—A. Michael Chambers
Attorney, Agent, or Firm—DeLio & Associates

[57] ABSTRACT

Shielded assembly for the delivery of fuel entirely disappearing into the ground and adapted to be used as gasoline pump in civil, in particular military, airports and heliports, bus stations, garages, gas station, said assembly comprising a gasoline pump vertically displaceable between an operative position and a concealed, shielded rest position in which it is entirely received in a casing buried in the ground and closed by a rugged manhole cover which is effraction-free, the vertical movements of the displaceable pump being controlled by a hydraulic cylinder and piston assembly coaxial with the telescopic pipes supplying the gasoline pump with the fuel of the tank.

7 Claims, 5 Drawing Sheets

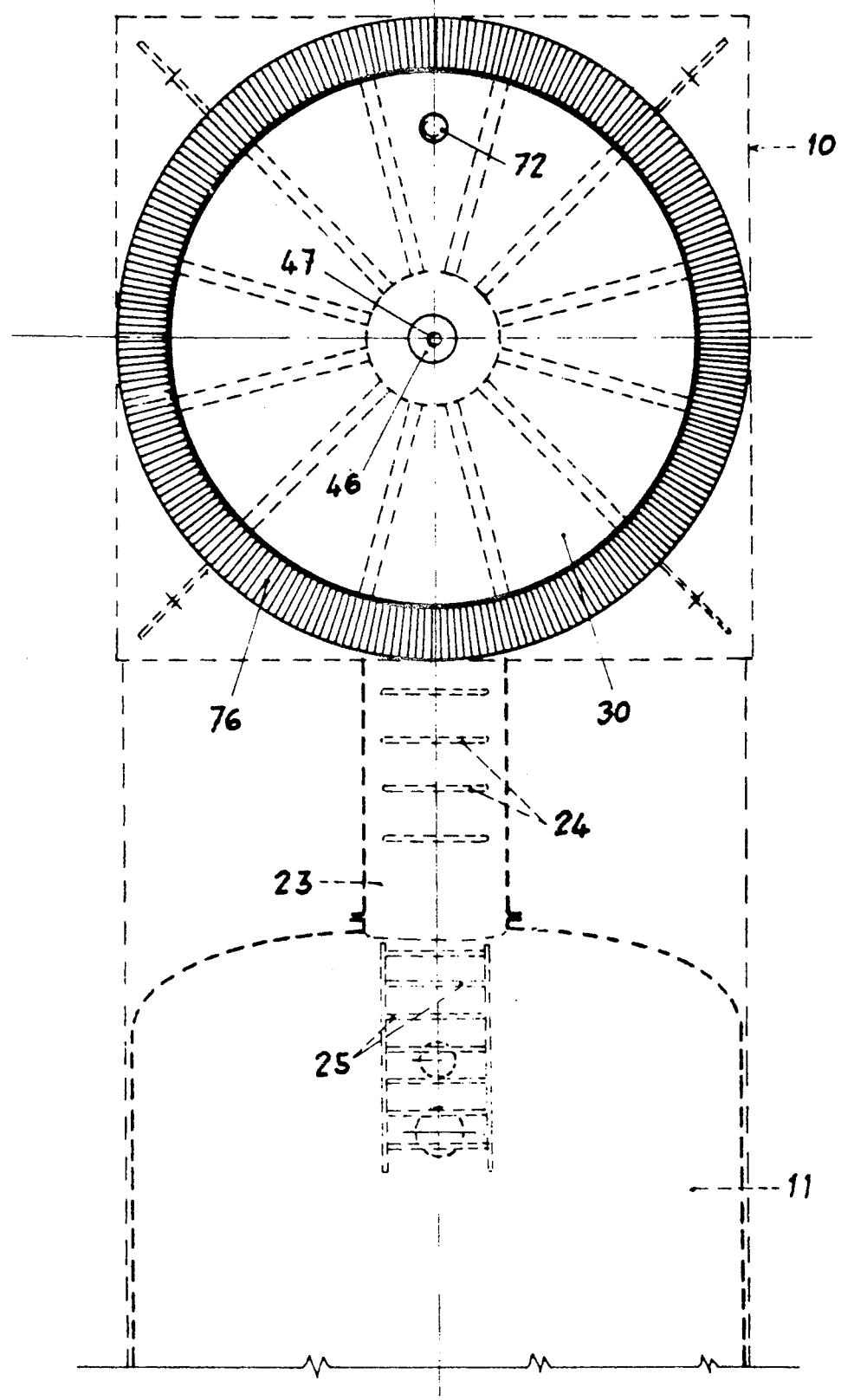

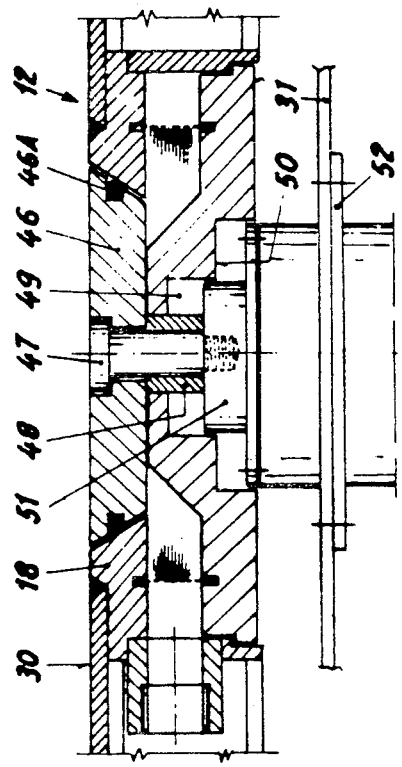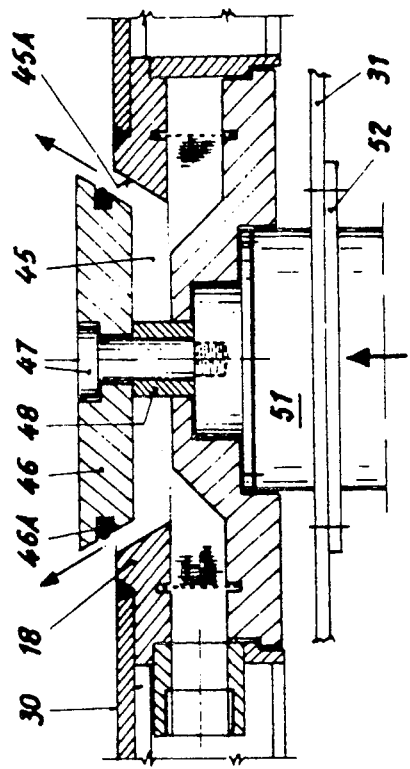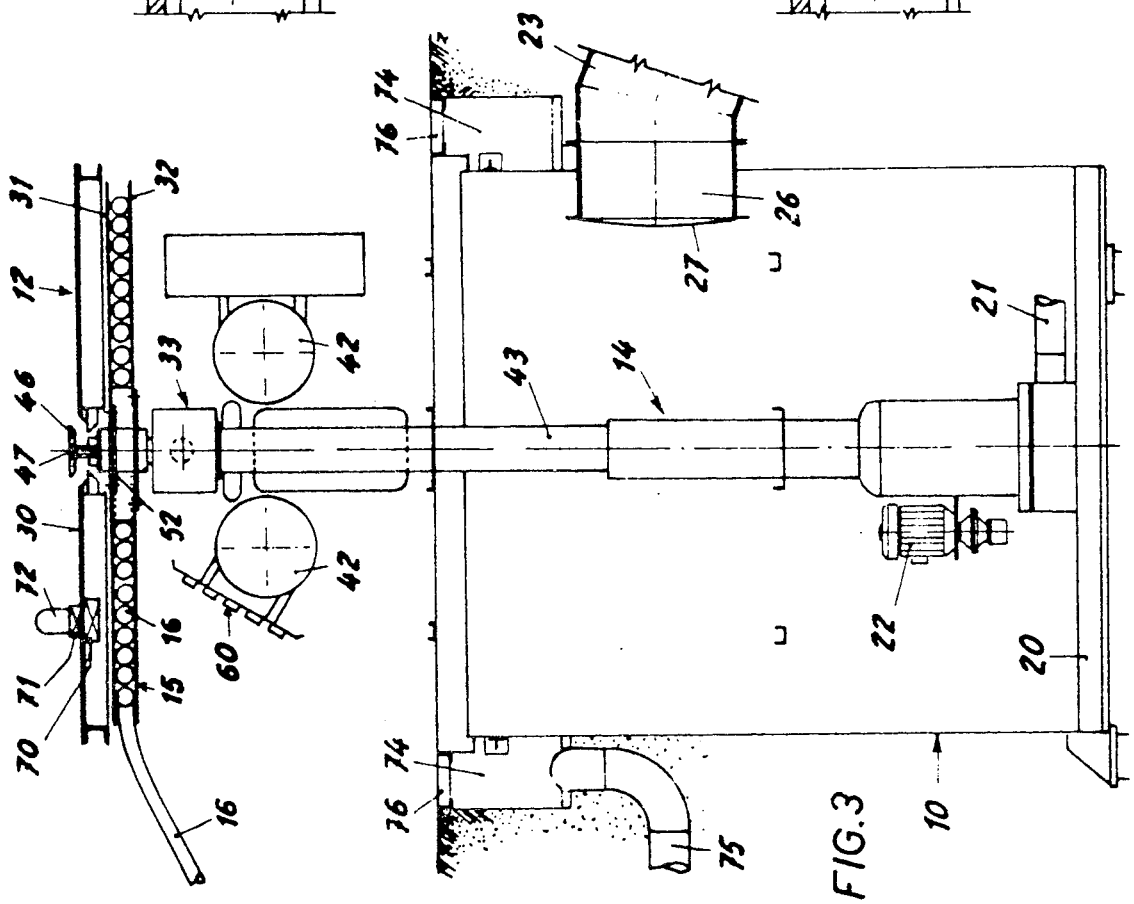

SHIELDED ASSEMBLY FOR THE DELIVERY OF FUEL ENTIRELY DISAPPEARING INTO THE GROUND AND DIRECTLY CONNECTED TO THE FUEL TANK THROUGH A MANHOLE

The present invention relates to a shielded assembly for the delivery of fuel entirely disappearing into the ground and adapted to be used as gasoline pump in civil, in particular military, airports and heliports, bus stations, garages, gas station, said assembly comprising a gasoline pump vertically displaceable between an operative position and a concealed, shielded rest position in which it is entirely received in a casing buried in the ground and closed by a rugged manhole cover which is effraction-free, the vertical movements of the displaceable pump being controlled by a hydraulic cylinder and piston assembly coaxial with the telescopic pipes supplying the gasoline pump with the fuel of the tank.

The emerging need of providing civil and military installations, remote, inhabited and non-inhabited places with fuel delivering plants as well as the concomitant need of assuring to such plants the maximum security against any attempt of effraction, tampering and sabotage even without service personnel has brought to conceive and design the shielded, entirely disappearing assembly of the present invention.

Such assembly has the maximum versatility and ductility of employment since it is adapted to be used as a shielded plant having size and dimensions varying from that for the refuelling of great civil and military aircrafts, helicopters, watercrafts and the like to that for a gas station for civil and commercial motor vehicles of any type using gasoline, Diesel oil and the like.

In its embodiment of larger size and greater dimensions the assembly of this invention is preferably connected through pipings to one or more buried tanks from which it draws off the fuel. Furthermore it is connected to the tank through a manhole easily practicable so as to allow the tank to be reached for check, maintenance and cleaning purposes.

The basic feature of this assembly is that it has a casing or exterior body entirely received in the ground, with respect to which the whole assembly of the delivery and control means, the filters and so on can assume two different positions as it will be better apparent thereafter.

In a first non operative position the assembly is entirely received and concealed in such exterior body, while in a second operative position the assembly rises from the exterior body and the ground so that the operator is allowed to operate the assembly and to control the fuel delivery.

It should be appreciated that the top of the vertically displaceable assembly is formed of a rugged armoured plate sealing the opening of the exterior body and lying on a level with the ground in the non-operative or lowered position of the assembly.

Further important features are that the first step of the raising movement of the armoured plate causes a central "plug" of the same to be partially opened in order to promote the outlet of any gas collected within the assembly; the raising of the assembly is effected by means of a hydraulic cylinder and piston assembly, the operation of which is controlled by a magnetic key placed on the armoured plate; the operating key has a built-in flashing light signalling the movement and the opened position of the plate; the armoured plate is surrounded by an opening for the outlet of the rain water; the manhole between exterior body of the assembly and fuel tank is closed by a sealing door provided with control wheel.

It should be noted that the raising assembly of the gasoline pump is also a means of supplying fuel from the tank to the delivery reel.

In other words the operation features of the assembly, comprising as better explained thereafter all of necessary, suitable, essential means for the delivery of fuel, are as follows:

supplying the tanks connected thereto with fuel drawn off from tanks and pipes outside the assembly after pumping, cleaning and gauging thereof;

self-contained airport fuel tank assembly;

standard gas station disappearing in the ground for supplying aircrafts, watercrafts, land transport means or stationary installations (turbine test stands, industrial plants) with fuel drawn off from tanks belonging to the system or from H.F.S. or exterior moving tanks.

The construction features are the following:

no superficial encumbrance when the assembly is not under operation or maintenance conditions; therefore the whole installation area of the assembly can be used for the parking and transit of cars, aircrafts and the like;

easy accessibility to the delivery means under operation and maintenance conditions; all of components and accessories thereof rise from the underground metal casing and are placed at the ground level when the assembly is being operated or under maintenance;

no flexible pipes or connections between the tanks of the system and the displaceable components of the assembly, said connection being established by special metallic sealing joint;

extreme compactness of the assembly since the components and accessories thereof are disigned and connected according to particular techniques;

utmost ease and rapidity of operation and maintenance also by non-skilled personnel.

Therefore the assembly has the maximum efficiency even if maintenance and controls are failing; the delivered fuel is according to the rule whatever the solid or liquid pollution factor of the drawn off fuel may be and independently of the controls and operations of the employed personnel. This is due to the fact that the delivered fuel is cleaned by special coalescers, i.e. microfilter/separators with very high efficiency.

It should be appreciated that the assembly has very high security level to fire, flood, sabotage, tamper, a.s.o.; as its components and accessories are inaccessible and sheilded when out of operation or maintenance the assembly does not require surveillance.

Furthermore all of latching, signal and control devices are installed in the disappearing assembly so as to further increase the already very high security factor.

Again, all of components and accessories of the assembly are shielded in the sealed casing of the delivery assembly, thus assuring thereto an excellent protection against severe environmental conditions such as high and low temperature, moisture, corrosive atmosphere, underground water-bearing stratum, a.s.o., along with a complete camouflaging and a very high resistance to the mechanical stresses due to transport and installation.

The assembly can also be easily transferred after the installation and allows long periods between ordinary maintenance operations having a five time lower frequency than the installation of the prior art.

The construction of the assembly is such as to allow an aircraft to be refuelled within 30 seconds from landing also under hot refuelling condition.

In this field EP-A-0150686 of the same applicant discloses an extensible cylinder and piston unit for supporting a vertically moving platform carrying a delivery device and feeding thereto a fluid under pressure from an underlying stationary tank which platform has a simple construction having little or no security against fire, flood, sabotage, tamper etc. Furthermore there are no protected connections between the hole receiving the platform and the supply tank.

The invention will be now described in detail with reference to the annexed drawings, wherein:

FIG. 2 is a top plan view;

FIG. 3 is a similar view as FIG. 1 with the assembly in the raised operative position;

FIG. 5 is a section showing the automatically opened top of the central portion of the closure plate, said top being in the closed position;

FIG. 6 is a similar view of said top in the opened position;

FIGS. 8 to 11 show several connection facilities of the assembly to one or more fuel supplying source such as one or more tanks, pipelines and the like.

Figure 1:
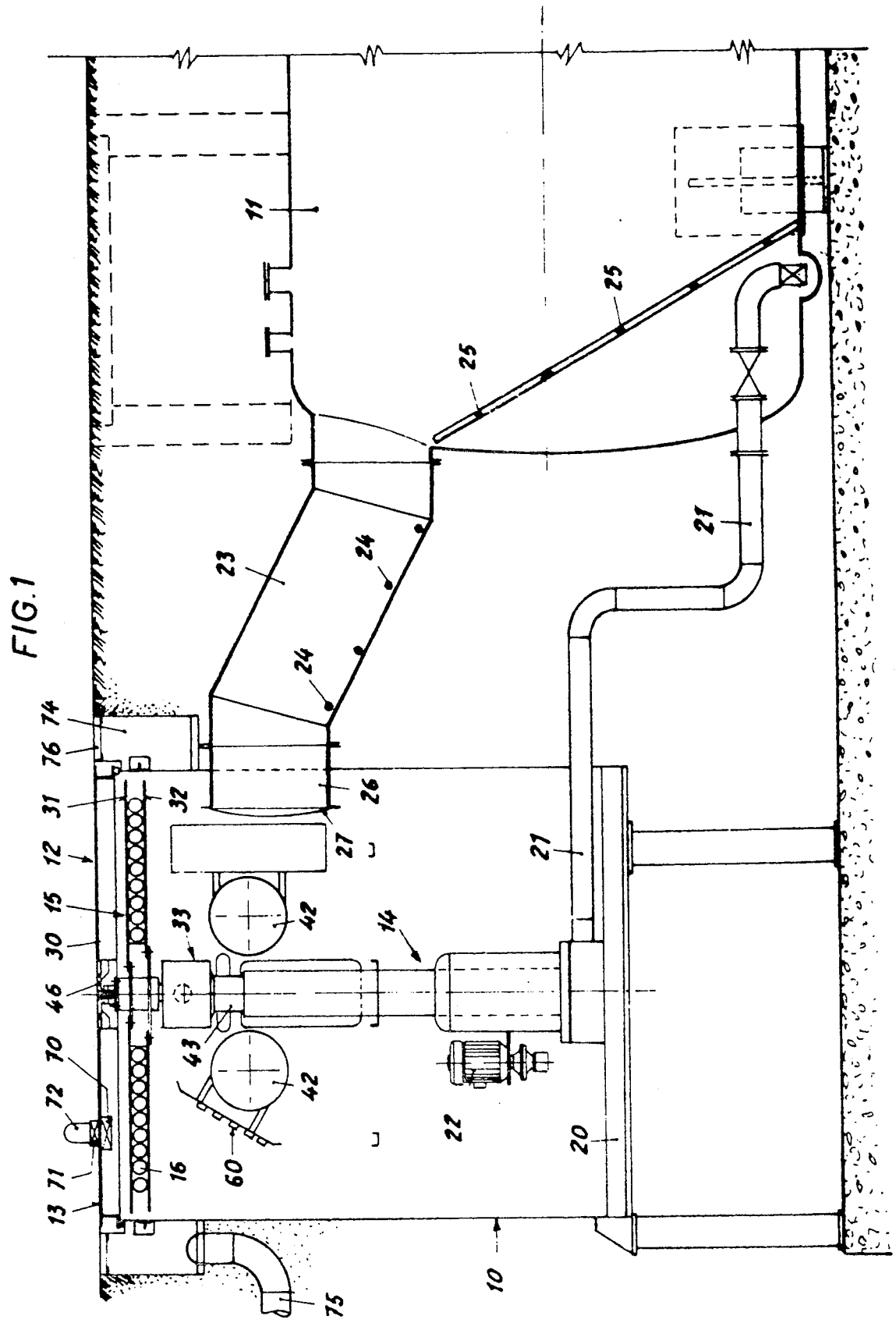
FIG. 1 is a vertical section of the assembly formed of the tank (partially cut-away), the pipings and connections therebetween and the ground in which it is received, the assembly being in the rest position in which it is completely retracted and housed in the casing.

With reference in particular to FIGS. 1 to 3 the shielded assembly for the delivery of fuel entirely disappearing into the ground and having a direct practicable connection to the tank essentially comprises: a cylindrical completely buried container 10 with its upper opening at the level of the ground; a completely buried tank 11; a gasoline pump 12 adapted to move vertically with respect to the container and having a top formed of a strong armoured plate 13 adapted to seal container 10; an assembly 14 consisting of a hydraulic raising assembly of the gasoline pump 12 and a connection means to the pipe from tank 11; a reel 15 about which a hose 16 for the connection to the aircraft, the vehicle or watercraft to be refuelled is wound. The gasoline pump is also provided with bearings, filters, controls and meters which will be better described thereafter.

Secured to the bottom 20 of the container 10 of strong sheet steel is the base of the telescopic assembly 14 for the lifting of the gasoline pump 12, said base being connected to tank 11 through pipe 21.

The motor drives the hydraulic system lifting the gasoline pump 12 and coaxial with the telescopic assembly 14 as set forth later on. Such assembly, however, is described in the Italian Patent Application No. 49519A/83 of the same Applicant.

Figure 4:
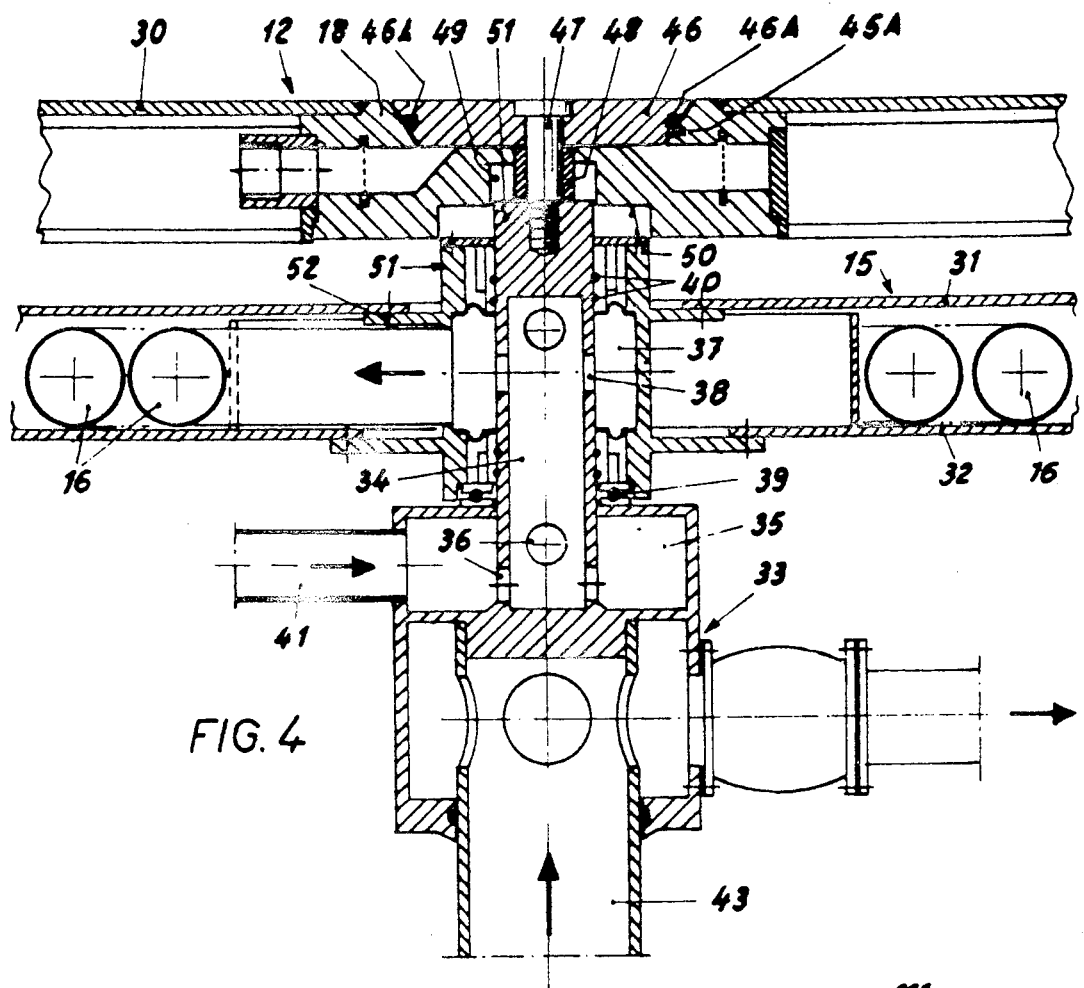
FIG. 4 is a section showing in enlarged scale the rotating connection chamber for conveying fuel from the vertical pipe to the rotating reel.
Figure 8:
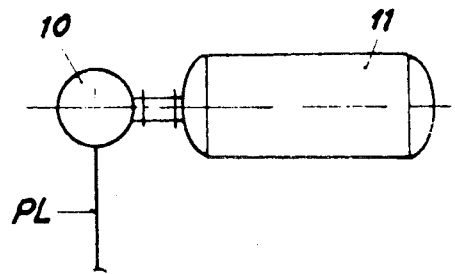
Figure 10:
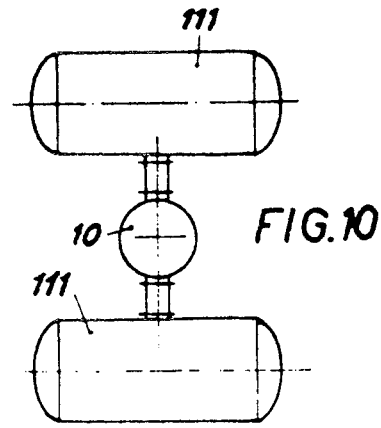
Figure 9:
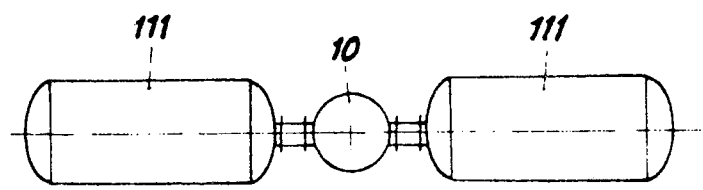

Container 10 is also connected to tank 11 through a tubular manhole 23 provided with grab rods 24 and a ladder 25 so as to provide a passageway to the tank to perform cleaning and maintenance operations. Entrance 26 of conduit 23 is closed by a rugged door 27. The construction of the upper armoured plate 13 having circular form is somewhat complicated as it is formed of an upper armoured portion 30 and a sandwich portion consisting of two circular overlapped plates 31 and 32 forming the reel 15 taking up the refuelling hose 16 (FIG. 4). The two plates are connected and supported by a rugged central member 18 substantially under the form of a spool supporting also the upper armoured plate 30.

The connection between the rotating reel 15 and the stationary top 33 of the telescopic assembly 14 is established through the stationary cylindrical chamber 34 connected to the lower stationary chamber 35 through openings 36 and to the upper rotating chamber 37 through openings 38.

The cylindrical chamber 34 acts as axis of rotation for reel 15, the rotating connection between each other being sealed by a thrust bearing 39 and two pair of sealing O-ring 40.

The fuel is delivered to the stationary chamber 35 through pipe 41 from filters 42 of gasoline pump 12, to which the fuel of tank 11 is delivered in turn through pipe 43 of telescopic assembly 14 which draws it off through the connecting pipe 21.

Formed above top 33 of pipe 43 at the middle of the central member 18 is a circular opening 45 (FIGS. 5 and 6) having an edge 45A of frusto-conical form and closed by a rugged "lid" 46 connected to a central "nail" 47 surrounded by a sleeve 48. Lid 46 having the same frusto-conical form of edge 45A abuts against the latter with a sealing gasket 46A.

Formed in the lower portion of member 18 is a cylindrical cavity designated by 49 having two diameters and comprising a step 50. Received in the cavity 49 is the end 51 of the top 33 of pipe 43 having a complementary form and carrying below a collar 52.

The described arrangement has the function, as better illustrated thereafter, to form the interior of container 10 under the armoured plate.

It should be noted that the arrangement of the upper part of the gasoline pump 12 is such that reel 15 rotates under the armoured plate 30 which remains stationary.

As already mentioned gasoline pump 12 comprises also all necessary components to deliver fuel according to the rule, i.e. (FIGS. 1 and 3) filters, control panel and indicators 60 comprising dead-man's handle controlling the delivery and breaking it off as the hand of the operator leaves hold of the handle, the defuelling handle controlling the emptying of the tank of a vehicle, generally an aircraft, the winding handle of reel 15.

Motor 22 causing the gasoline pump to be raised is driven from the outside of the upper plate 30 by a magnetic lock 70 operated by a key 71 which is provided with a flashing light 72 operating as long as gasoline pump 12 is in the operative position (FIG. 3).

As can be better seen in FIGS. 1, 2 and 3, a circular channel 74 provided with a drainage pipe 75 is formed about the edge of container 10, said channel being protected by a radial grid plate 76 which can support heavy loads.

In operation, key 71 is placed on the magnetic lock 70 so as to drive motor 22 which causes pipe 43 to be raised by means of the hydraulic sistem already described and illustrated in the above mentioned Patent Application No. 49519A/83. In the first step of the raising stroke end 51 (FIG. 5 lifts nail 47 and then plug 46 assuming the position of FIG. 6 with the result of a ventilation of the inner assembly.

As the lifting proceeds gasoline pump 12 reaches the position of FIG. 3 in which it is ready to operate. After the end of the refuelling the rotation of key 71 with respect to magnetic lock 70 will drive motor 22 so as to lower pipe 43 and gasoline pump 12 again. In the last step of the lowering stroke opening 45 is closed by plug 46.

Figure 7:
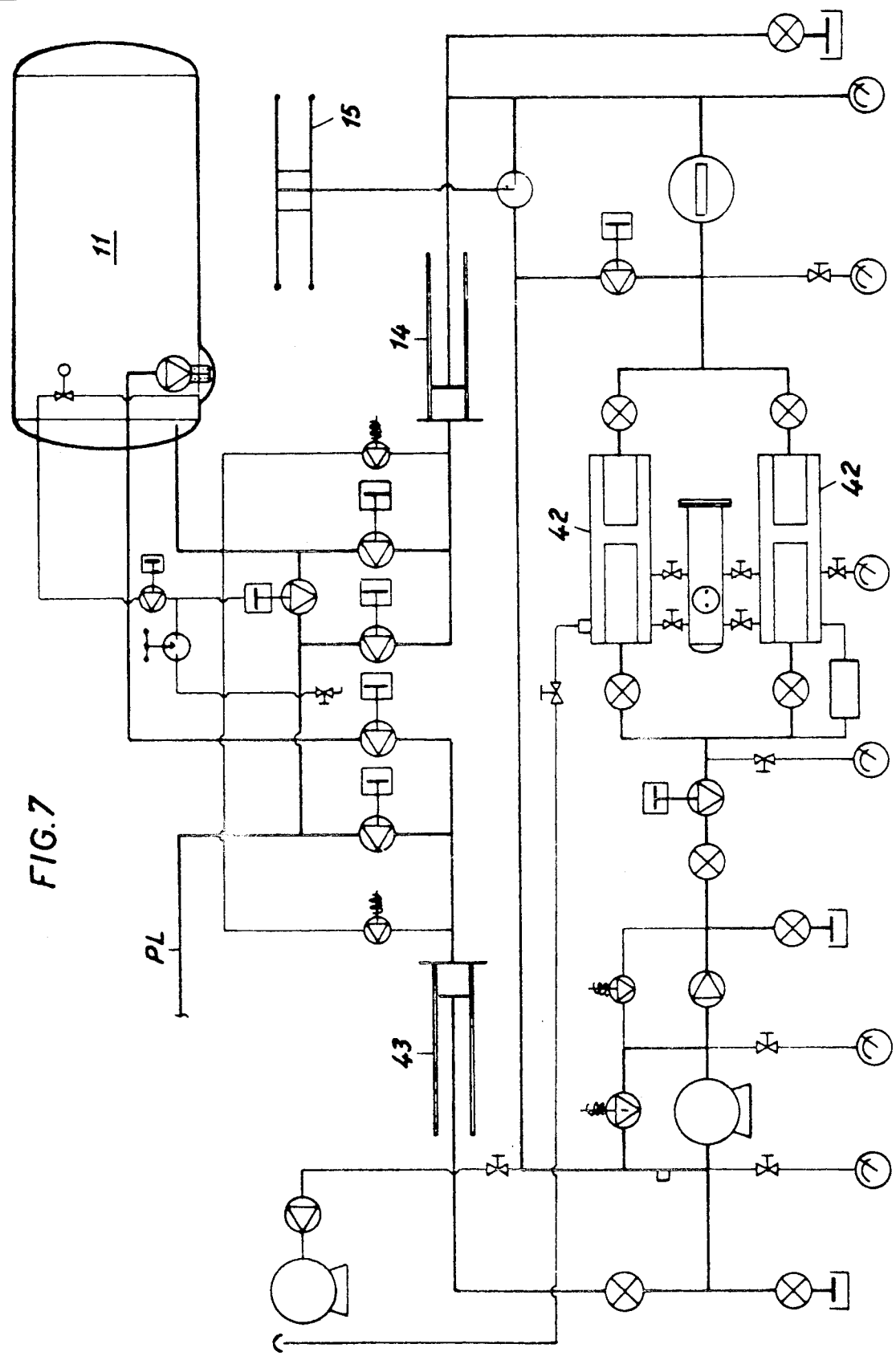
FIG. 7 is a general view of the hydraulic, mechanical and oleodynamic circuits of the assembly.

The whole set of operative components of the assembly is shown in FIG. 7.

It should be appreciated that container 10 is connected to tank 11 by a direct, protected passageway formed of a manhole 23 (FIG. 1) protected by an armoured door 27 giving the assembly the maximum security feature.

Figure 11:
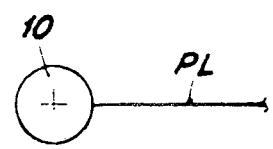

Finally, FIGS. 8 to 11 show the assembly of the invention associated to a tank 11 and a pipeline PL (FIG. 8), to two tanks 111 (FIGS. 9 and 10) and to a pipeline PL (FIG. 11).

I claim:

1. A shielded assembly for the delivery of fuel, entirely disappearing into the ground and adapted to be used as gasoline pump delivering fuel from a suitable supply source as a supply tank (11), in civil, in particular military, airports and heliports, bus stations, garages, gas stations, said assembly comprising a gasoline pump provided with the components and accessories usually needed for the refuelling according to the rule meeting the requirements for refuelling military vehicles, such as pumping, filtering and metering members including a refuelling hose (16) and a reel (15) therefor, and vertically displaceable between an operative position and a concealed, shielded rest position in which it is entirely received in a casing (10) buried in the ground and closed by a rugged armoured tamper-free plate (30), the vertical movements of the displaceable pump being controlled by a hydraulic cylinder and piston assembly (14) coaxial with the telescopic pipes supplying the gasoline pump with the fuel of the tank (11), under control of a motor (22) operated by control means actuated from the outside of said armoured plate, characterized in that said armoured plate (30) has a central opening (45) closed by a plug (46) which is raised and opened by the upper end (47) of said telescopic piston (43) of said raising assembly (14) during the initial step of the raising stroke and closed at the end of the lowering stroke, to allow any gas developed within the assembly to escape therefrom.

2. The shielded assembly entirely disappearing into the ground of claim 1, wherein said reel (15) is mounted as a unit with said upper armoured portion (30) of said armoured plate (13) and comprises a sandwich construction consisting of two parallel circular overlapped plates (31,32) connected and supported by a rugged central member (18) essentially shaped as a spool, which member (18) also supports said armoured portion (30).

3. The shielded assembly entirely disappearing into the ground of claim 2, wherein the connection between said reel (15) and the stationary top (33) of said telescopic assembly (14) is established through a stationary cylindrical chamber (34) connected to a lower stationary chamber (35) through openings (36) and to an upper rotating chamber (37) through openings (38) so that said cylindrical chamber (34) acts as axis of rotation for said reel (15) the rotating connection between each other being sealed by a thrust bearing (39) and two pairs of sealing O-ring (40), this construction allowing said reel (15) to rotate for releasing said hose (16) while said upper plate (30) is kept stationary.

4. The shielded assembly entirely disappearing into the ground of claim 1, wherein the assembly is supplied with fuel by said tank (11) buried adjacent thereto and connected thereto through pipes (21) of known type for the fuel supply, the inside of said tank (11) being connected to said container (10) through a manhole (23) provided with grab rods (24) and closed by a rugged door (27).

5. The shielded assembly entirely disappearing into the ground of claim 1, wherein said control means of the motor (22) consists of a magnetic lock (70) built in said armoured plate (30) and an associated magnetic key (71) which key comprises a flashing light (72) operating as long as said key (71) is placed on said magnetic lock (70) to indicate the presence of the raised assembly in the dark.

6. The shielded assembly entirely disappearing into the ground of claim 1, wherein the winding reel of the refuelling hose comprises two cylinder plates supported by a central member rotating about a stationary cylindrical chamber through which the fuel is supplied to said hose.

7. The shielded assembly entirely disappearing into the ground of claim 1, wherein said buried casing is surrounded by a water drainage channel provided with outlet pipe and protected by a rugged grid adapted to support high loads.

* * * * *

UNITED STATES PATENT AND TRADEMARK OFFICE
CERTIFICATE OF CORRECTION

PATENT NO. : 5,195,554

DATED : March 23, 1993

INVENTOR(S) : Gaetano Cutore

It is certified that error appears in the above-identified patent and that said Letters Patent is hereby corrected as shown below:

On the title page:
  Under item [19], please delete "Gaetano" and substitute therefor --Cutore--, which is the inventor's surname.
  At item [76], please delete "Cutore Gaetano" and substitute therefor --Gaetano Cutore--.

In The Abstract: item [57], col. 2,
  In Line 2, please insert --a-- after "as".
  In Line 4, please delete "station" and substitute therefor --stations--.

In Column 1, Line 9, please insert --a-- after "as".
  In Column 1, Line 11, please delete "station" and substitute therefor --stations--.
  In Column 1, Line 48, please insert a "-" between "non" and "operative".
  In Column 3, Line 16, please delete "pipings" and substitute therefor --piping--.
  In Column 3, Line 68, please delete "sandwhich" and substitute therefor --sandwich--.

UNITED STATES PATENT AND TRADEMARK OFFICE
CERTIFICATE OF CORRECTION

PATENT NO. : 5,195,554

DATED : March 23, 1993

INVENTOR(S) : Gaetano Cutore

It is certified that error appears in the above-identified patent and that said Letters Patent is hereby corrected as shown below:

Column 4, line 60, delete "sistem" and insert --system--.

Signed and Sealed this

Thirtieth Day of November, 1993

Attest:

BRUCE LEHMAN

*Attesting Officer*

*Commissioner of Patents and Trademarks*